UNITED STATES PATENT OFFICE.

CARLETON FLLIS, OF MONTCLAIR, NEW JERSEY.

HYDROGENATION OF FATS AND THE LIKE.

1,174,245. Specification of Letters Patent. Patented Mar. 7, 1916.

No Drawing. Application filed February 24, 1912. Serial No. 679,771.

*To all whom it may concern:*

Be it known that I, CARLETON ELLIS, a citizen of the United States, and a resident of Montclair, in the county of Essex and State of New Jersey, have invented certain enw and useful Improvements in Hydrogenation of Fats and the like, of which the following is a specification.

This invention relates to the treatment of organic compounds such as oleaginous material containing unsaturated bodies with hydrogen in the presence of a body capable of serving as a carrier of the hydrogen to the aforesaid oleaginous material and relates particularly to the treatment of fats and oils with hydrogen in the presence of active charcoal or other active forms of carbon, or other equivalent active non-metallic bodies.

In the present invention I treat oleaginous materials or other material of a similar character with hydrogen gas, or similar reducing gas in the presence of a non-metallic body capable of occluding hydrogen, such as carbon in its various forms and particularly charcoal, although in so far as same may be active animal black, bone black, lamp black, gas black and the like may be used. Graphite or charcoal may be deflocculated in which colloidal form they are active on some oils.

Charcoal has the property of absorbing gases to a marked degree. At atmospheric pressure freshly prepared charcoal will absorb about four volumes of hydrogen at 0° C. This occluding effect increases with the pressure but is reduced to some extent by increase in temperature and in the present invention, I take cognizance of this relation between pressure and temperature in order to secure the most effective action at a given temperature. Charcoal acts also as a bleaching and deodorizing agent and is therefore useful other than as an occluding agent for hydrogen. Charcoal may also be used as a supporting material for metallic catalyzers including such elementary catalyzers as nickel, platinum, palladium, copper and the like. The advantages of charcoal, or other form of carbon as a supporting material are several. In the case of a catalyzer of a metallic nature which becomes spent after using for a time, the charcoal carrying the metal may be ignited, when the metal, or its oxidation products are recovered and may be prepared again for use. This obviates the necessity of treatment with acid to dissolve a small amount of metal catalyzer from a large amount of supporting material of an inert character, such as pumice, infusorial earth, asbestos and the like. Another advantage is that because of the occluding action of charcoal for hydrogen, there exists the joint action of the charcoal and the metallic catalyzer upon oil, which improves or accelerates the reaction. In preparing the charcoal for use in this way I preferably ignite a good grade thereof to expel any gases which may have been absorbed. It is desirable to remove all air from the pores of the charcoal and therefore, after the charcoal has been ignited and before it is cooled, I preferably pass through the mass a gentle current of hydrogen gas. Prior to such ignition however, the charcoal may be treated with a solution containing a metallic salt, the metal of which acts as a catalyzer in which case the metallic compound may be thus reduced, to precipitate or coat the charcoal with a metallic catalyzing body. To this end ignition in hydrogen should preferably be carefully controlled as regards temperature, because metallic catalyzers are rather sensitive to excessive heating and oftentimes entirely lose their effectiveness if overheated. I prefer not to impregnate the charcoal too deeply with such a catalyzer agent of a metallic character, but instead, preferably treat the material so as to have merely a thin or substantially superficial layer of the metallic catalyzer on the charcoal support. Sometimes this may be accomplished by dipping the charcoal in a strong solution of the metallic salt, removing quickly and immediately drying, thus incrusting the surface or superficial portion of the charcoal mass with the metallic salt.

An effective catalyzing agent, useful in carrying out the operation of the present invention is found in the platinum group of metals as for example platinum itself. This may be applied to charcoal as a chlorid or in any other suitable solution. Chlorin is however, an undesirable body to have present in the catalyzing mass when used for the treatment of fats, as this element sometimes shows a tendency to depress the activity of the catalyzer. The hydrogen gas used is therefore also preferably free from chlorin. Nickel may likewise be applied to the charcoal surface using such salts as nickel sulfate or acetate and the like. A very satisfactory form of nickel catalyzer may be obtained by dissolving the hydroxid in ammonia and treating the charcoal with this solution. On slight heating the ammonia is expelled and the nickel compound precipitated on the charcoal. This material is then reduced in a current of hydrogen at a relatively low temperature. Nickel nitrate, which is sometimes used on a mineral support for preparing the catalyzing body is not a desirable salt to use in the present case, owing to the oxidizing action of the nitric acid on the charcoal. Another manner of preparing the catalyzer is to precipitate a soluble nickel salt with carbonate of soda or some other precipitant, subsequently collecting the precipitate, adding preferably a little sugar, dextrin or other binding agent, and rolling granular charcoal with the damp precipitate, so as to coat the surface of the granules with the insoluble nickel salt. This material may then be dried and heated in a current of hydrogen.

As stated, the hydrogen employed should be pure to get the best results with some metallic catalyzers, although in some cases the presence of impurities does no material harm. Arsenic should be avoided with catalyzers of the nature of platinum because of its poisoning action. Nickel salts of high purity are used in preference to commercial grades. A metallic catalyzer often is quickly effected by oxygen, so that it is desirable not to expose the finished catalytic body to the air prior to its actual use. It is also desirable to remove the air from the oil employed and to this end it is to be recommended that the oil be heated to a temperature of about 150 degrees or even higher prior to mingling with the catalyzer. Blowing the oil with hydrogen gas, immediately before using is also beneficial. Granules of charcoal carrying about 5% of superficially-deposited metallic platinum may be used to treat, for example, fish oil; as follows:—Two per cent. of the granular material is mixed with the oil and placed in a closed receptacle. The temperature of the oil is raised to nearly 200° C. and hydrogen introduced at about 25 pounds pressure. The oil and catalyzer are gently stirred for a period of an hour or so, until hydrogenation has progressed to the degree desired.

The selective hydrogenation of oils to reduce merely the highly unsaturated bodies preferably is conducted at a somewhat lower temperature. The oil may also be treated in other specific ways in the presence of the catalyzing body, as, for example, by violently agitating the oil in the presence of the catalyzer, or by atomization or by filtration through a heated bed of charcoal granules with or without a metallic catalyzer.

Another method which may be used is that of passing the oil through a large tube, which preferably is differentially heated, which tube is partially or entirely filled with charcoal granules, with or without a metallic catalyzer. This tube is gently inclined and the oil is allowed to flow gently in one direction, while hydrogen gas is passed in a counter direction. This manner of treatment has been described in my co-pending application, Serial No. 656,100, which has matured into Letters Patent 1,026,156, May 14, 1912.

As apparatus of various types may be used for carrying out the present process and as the details of such apparatus are not pertinent to the essentials of the invention claimed herein, no drawings of apparatus are shown.

Instead of hydrogen gas, as such, gases containing hydrogen, such as water gas, may be used.

Another method of coating charcoal, or similar carbon occluding agents with a metallic catalyzer is that of electrolytically depositing the metal from a contacting saline solution on charcoal granules. For this purpose a current of relatively high density preferably is employed in order to produce a metallic sponge in a highly comminuted state.

A temperature of 160 to 170 degrees is well suited for the treatment of many fats and oils and I preferably employ temperatures ranging between 150 degrees and 200 degrees C., although lower temperatures may be employed with the active charcoal, or other carbon containing occluding agent, than when a metallic catalyzer is used alone. This has an advantage, as the oil is less likely to be discolored when the operation is conducted at a moderate temperature. On the other hand, heating of the oil to temperatures above 200 degrees for some purposes is undesirable as a rule because of the danger of discoloration. At the temperatures mentioned, it is desirable to employ the hydrogen under considerable pressure, preferably at least 10-lbs. to the square inch and more effectively at a pressure of about 25-lbs. to the square inch, although a pressure higher than this particularly when using active charcoal alone may be employed when desired.

To recapitulate, my invention relates to the process of adding hydrogen and the like to organic compounds such as oleaginous material containing unsaturated bodies, which comprises subjecting such compounds or material to the action of the additive element in the presence of active carbonaceous material and the like, such as wood charcoal preferably freed from occluded oxygen, and with or without associated metallic catalysts and preferably in adjusting the pressure of the hydrogen and the like with respect to the temperature employed; whereby the desired degree of saturation of said material is effected.

What I claim is:—

1. The process of treating oleaginous material containing unsaturated bodies which comprises directly contacting said material in a heated state with free gaseous hydrogen under pressure in the presence of active non-metallic material and metallic material both free from occluded oxygen, and in adjusting the temperature with respect to the hydrogen pressure; whereby hydrogen is added to said unsaturated bodies.

2. The process of treating oily material containing unsaturated bodies which comprises directly contacting said material in a heated state with a hydrogen-containing gas under pressure in the presence of active carbonaceous material and metallic material both free from occluded oxygen, and in adjusting the temperature with respect to the gas pressure; whereby hydrogen is added to said unsaturated bodies.

3. The process of treating oily material and the like containing unsaturated bodies which comprises treating same with a hydrogen-containing gas in the presence of active carbonaceous material and a metal of the platinum group.

4. The process of treating oily material and the like containing unsaturated bodies which comprises treating same with hydrogen in the presence of platinum and active charcoal.

5. The process of treating oily material and the like containing unsaturated bodies which comprises treating same with hydrogen in the presence of platinum coated on but not impregnating active charcoal free from inert bodies.

6. The process of treating oily material and the like containing unsaturated bodies which comprises treating same with a metal of the platinum group coated on active charcoal substantially free from inert carbonaceous bodies.

Signed at Montclair, in the county of Essex and State of New Jersey this 23rd day of February, A. D. 1912.

CARLETON ELLIS.

Witnesses:
BIRDELLA M. ELLIS,
R. F. STEWARD.